May 15, 1928.
W. S. GRAHAM
WHEEL RIDGE BUSTER
Filed Sept. 25, 1925
1,669,935
2 Sheets-Sheet 1
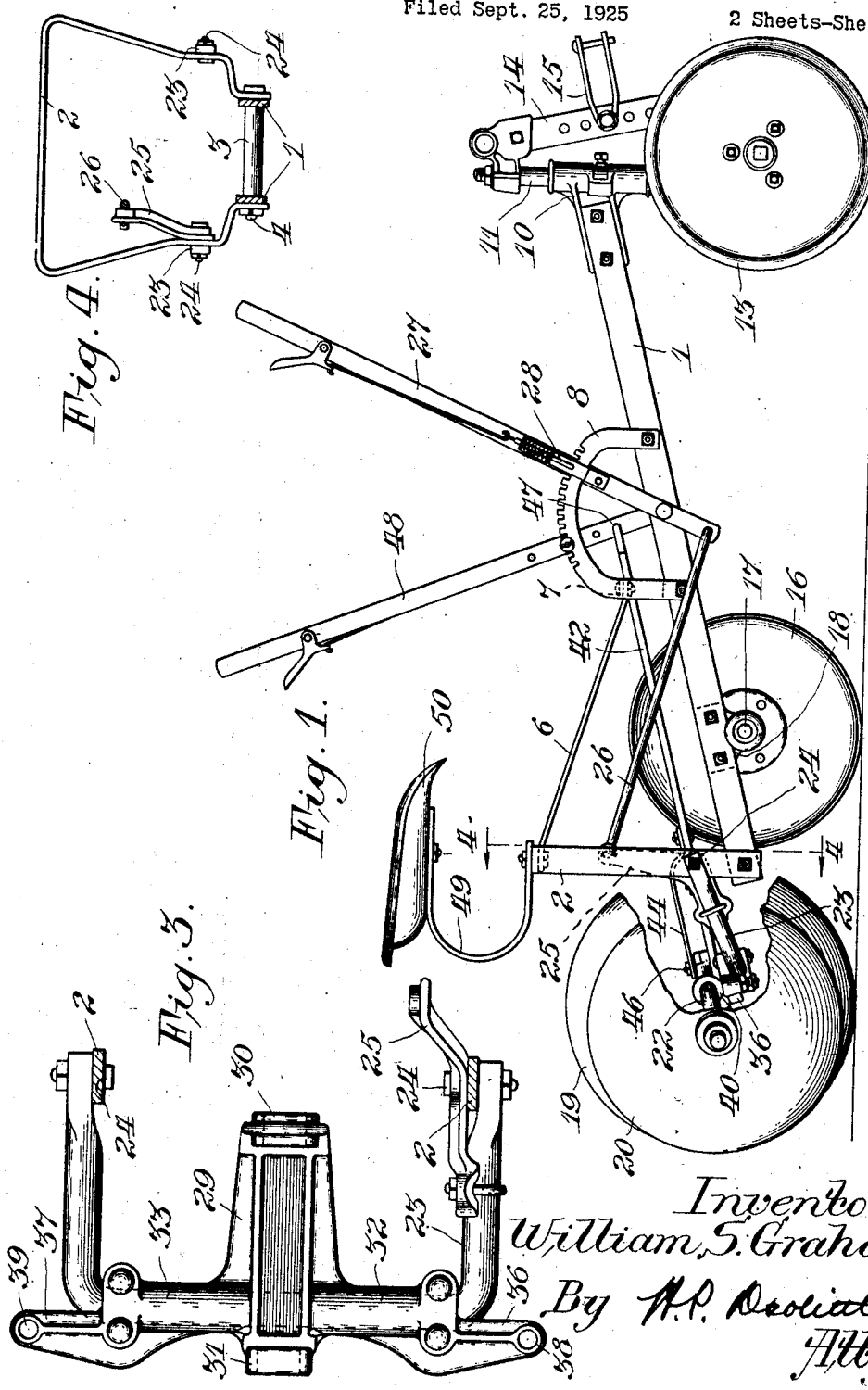
Inventor.
William S. Graham,
By W. P. Doolittle
Atty.

May 15, 1928.
W. S. GRAHAM
WHEEL RIDGE BUSTER
Filed Sept. 25, 1925
1,669,935
2 Sheets-Sheet 2
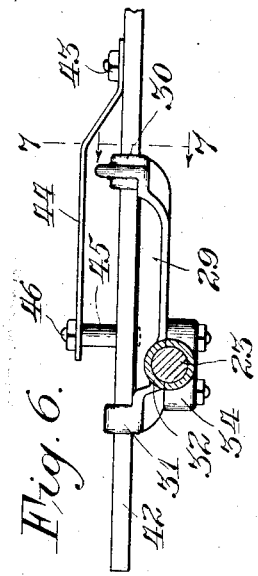
Fig. 6.
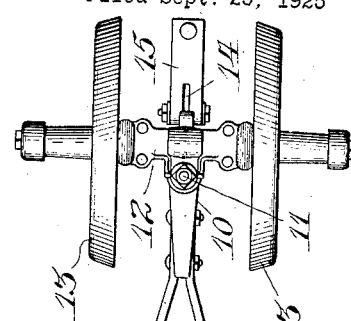
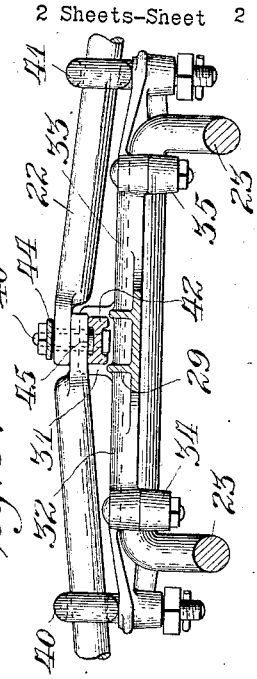
Fig. 5.
Fig. 7.
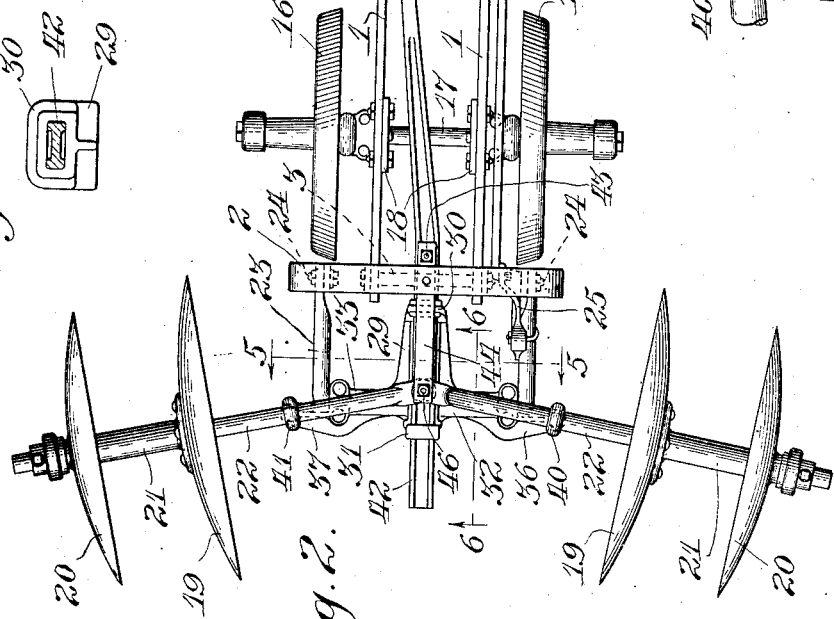
Fig. 2.
Inventor:
William S. Graham,
By W. P. Doolittle
Atty.

Patented May 15, 1928.

1,669,935

UNITED STATES PATENT OFFICE.

WILLIAM S. GRAHAM, OF CANTON, ILLINOIS, ASSIGNOR TO INTERNATIONAL HARVESTER COMPANY, A CORPORATION OF NEW JERSEY.

WHEEL RIDGE BUSTER.

Application filed September 25, 1925. Serial No. 58,514.

This invention relates in general to tillage implements and has more particular reference to a type of harrow known as a ridge buster.

In certain forming territories it is customary to work the ground into alternate ridges and furrows for the purpose of retaining moisture. Subsequently, the ridges are broken down and the ground leveled just prior to planting, the moisture present in the freshly burst ridges promoting rapid plant growth. My invention provides an implement of improved construction for traversing the furrows and carrying disks which operate to level or burst the ridges.

In providing such an implement, my object has been, primarily, to construct such controlling and guiding devices for the disks that the latter may be maintained in effective working position relative to the ridges, that the earth displacement of the disk may be effectively regulated at the will of the operator and that the depth of cut of the disks may be desirably governed. My invention, its mode and principle of operation will be better understood by reference to the following specification when considered in connection with the accompanying drawings, wherein:

Fig. 1 is a side elevation of a ridge buster illustrating my invention, parts of the disks being broken away to better disclose their adjusting devices;

Fig. 2 is a top plan view of the ridge buster shown in Fig. 1;

Fig. 3 is a detail plan view of the disk adjusting bail and its attendant angling yoke;

Fig. 4 is substantially a vertical section of the seat arch, taken on the section line 4—4 of Fig. 1;

Fig. 5 is partially a vertical section, and partially an elevation taken in the plane indicated by the section line 5—5 of Fig. 2, looking in the direction of the arrows;

Fig. 6 is substantially a side elevation of the central part of the disk angling mechanism taken on the section line 6—6 of Fig. 2; and Fig. 7 is a detail view taken in a vertical plane on the section line 7—7 of Fig. 6.

The illustrative ridge buster includes a main frame having rearwardly and downwardly extending side rails 1, preferably fashioned of standard bar iron or steel. These rails extend substantially in parallel relation throughout the major portions of their lengths, their forward ends converging to points where they are rigidly joined by parts hereinafter described.

An arch 2 is joined to the rear ends of the side rails to desirably maintain the latter in spaced relationship and form the end of the main frame. This arch is shown as being substantially of the form of an inverted U with its legs extending downwardly to points where they are secured to the side rails in a manner clearly indicated in Fig. 4 of the drawings. In this figure the spacing sleeve 3 is shown extending between corresponding pairs of the side rails and the legs of the arch. This sleeve is maintained in place by the tie-bolt 4 which extends through the side rails and arch legs. The arch 2 is held in the substantially upright position shown by means of a brace rod 6 which is secured at its forward end to a cross bar 7 bolted at its ends to parallel adjusting lever racks 8 and 9, respectively. These racks are rigidly secured to the guide rails as shown.

The forward end of the frame is supported by a dirigible truck comprising the standard 10, the pivot post 11, the axle bracket 12, the forward guide wheels 13, the adjustable hitch bar 14, and the clevis 15. This truck is held properly related to the frame by reason of the rigid securement of the converging ends of the side rails 1 to the standard 10, as clearly indicated in Fig. 1 of the accompanying drawings.

The frame is supported at its rear end by rear guide wheels 16 connected by the axle 17 which, in turn, supports the brackets 18 fixed to the respective side rails of the frame.

The disks, which actually engage and cut down the ridges of earth are located in pairs at each side of the ridge buster. Each pair comprises an outer disk 20 and an inner disk 19 rigidly joined in spaced relationship by a hollow cylindrical sleeve 21. Each sleeve rotates upon the outer end of an axle 22. The inner ends of these axles are pivotally joined so as to be capable of adjustment fore and aft of the implement by devices hereinafter described.

The disks, through their axles 22, are properly angled and effectively elevated and depressed with respect to the frame and the ridges of earth being treated, by means of an assembly of elements which are pivotally supported at the rear of the frame by a bail 23. The forwardly extending legs of this bail are pivoted at 24 to the vertical parts of the arch 2. One of the legs of the bail has a crank arm 25 fixed thereto near its pivotal point. A link 26 connects the upper end of this arm to a depth adjusting lever 27 which is pivoted to one of the side rails and provided with a conventional detent mechanism 28 cooperating with the segmental rack 8. This arrangement of elements is clearly shown in Fig. 1 of the drawings, and the bail structure is particularly well shown in Fig. 3.

Referring to Fig. 3, an adjusting bracket or yoke is shown journaled upon the bight of the bail 23. This yoke comprises the central guide portion 29 having forward and rear guiding sleeves 30 and 31, respectively, integrally formed therewith. These sleeves are longitudinally aligned, one being located forwardly of the bail and the other rearwardly thereof.

Intermediate the ends of the central guide portion 29 the yoke is extended in opposite directions in the form of bearing brackets of substantially semi-circular cross section, as indicated at 32 and 33. Lower journal brackets 34 and 35 cooperate with the ends of the bearing brackets 32 and 33, respectively, to complete the journal structures by which the yoke is rotatively mounted upon the bight of the bail 23.

For the purpose of providing suitable supports for the disk axles, the extreme opposite ends of the yoke are extended beyond the legs of the bail 23, as indicated at 36 and 37 in Fig. 3. These ends are provided with holes 38 and 39 through which the shanks of eye-bolts 40 and 41 are passed so as to be freely pivotally mounted upon the yoke. The disk axles 22 are substantially swivelly mounted in the eyes of these bolts midway of their lengths, as clearly shown in Figs. 2 and 5.

Slidably guided by the sleeves 30 and 31 for longitudinal reciprocal movement relative to the bail 23, there is provided a disk angling link or strap 42. As shown in Fig. 6, this link has secured thereto at 43 a rearwardly extending hammer strap 44 spaced from the link at its rear end by a hollow cylindrical sleeve 45 upon which the inner ends of the disk axles 22 are pivotally mounted, as clearly shown in Fig. 5. A tie-bolt 46 passes vertically through the link 42, the sleeve 45, the disk axles 22, and the hammer strap 44 to effectively maintain these parts in operative relationship.

The above described assembly of parts is moved in fore and aft directions as desired, by means of a disk angling lever 48, to which the forward end of the link is connected by means of a horizontally and laterally extending pivot pin 47. A conventional detent mechanism mounted upon the lever 48 cooperates with the segmental rack 9 to secure the lever in any desired position.

A conventional operator's seat 50 is shown suitably mounted upon the arch 2 by means of a resilient U-shaped bar 49.

It will be observed that by reason of the structure above described the disk angling devices are operable to effectively govern the working positions of the disks in any position of vertical adjustment of the latter. This results from the peculiar manner in which the elevating mechanism and the angling devices are joined. By reason of the pivotal mounting of the yoke, comprising the parts 29, 30, 31, 32, 36, 37, 38 and 39, the component elements of the disk angling mechanism operate as well in one vertical position of the bail 23 as in any other vertical position.

Having described my invention, I claim:

1. A ridge buster comprising a frame, wheels for supporting said frame and properly guiding it centrally of a furrow to be traversed by the ridge buster, disks carried by the frame, means including a rearwardly arched bail pivotally mounted on the frame for elevating and depressing the disks, a disk supporting member journaled upon said bail, disk axles pivotally mounted upon the supporting member, and disk angling means rectilinearly guided by and mounted upon the supporting member.

2. A ridge buster comprising a frame, guide wheels for supporting said frame, said guide wheels arranged to tread in a single furrow between two adjacent ridges so as to maintain the ridge buster in substantial longitudinal alignment with the longitudinal medial line of the furrow, two of said guide wheels constituting part of a dirigible front truck for the frame, earth working disks arranged in pairs laterally externally of the sides of the frame, said disks being elevated and depressed by means including a bail having forwardly extending arms pivotally mounted on the frame, link and lever mechanism for adjusting said bail relative to the frame, a yoke journaled upon the central portion of said bail, outwardly extending disk axles substantially swivelly mounted upon the yoke, devices pivotally connecting the inner ends of said disk axles centrally longitudinally of the frame, and a member slidably guided by said yoke and connected to said devices to angle the disks as desired.

3. A ridge buster comprising, in combination, a frame, disk axles carried by the frame, a disk mounted upon each axle, an upwardly arched support secured to the frame at the rear end thereof and extending transversely of the frame, said support extending beyond the sides of the frame, a rearwardly arched bail having forwardly extending arms pivotally connected to the legs of the support, means for pivotally connecting the disk axles to the bail so that the axles may be moved about substantially upright axes, and a manually operated lever connected to the inner ends of the disk axles for angling the disks by turning them about such upright axes.

4. An agricultural implement of the class described comprising, in combination, a frame, relatively movable disk axles carried by the frame, a disk mounted upon each axle, an upwardly arched support secured at the rear of the frame and extending transversely beyond the sides of the frame, a rearwardly arched bail having forwardly extending arms pivotally connected to the legs of the support, manually operated means for swinging the bail, means for mounting the disk axles upon the bail so that the axles may be moved about substantially upright axes, and manually operated means connected to the inner ends of the disk axles for changing the angles of the disks.

5. A ridge buster comprising, in combination, a traveling support, a bail pivotally mounted on the support, a disk supporting member pivotally mounted on the bail, disk axles slidably and pivotally mounted on said member, earth working disks mounted on the axles, and a bar pivoted to the support at a point remote from the bail and engaging said member to limit the latter to slight pivotal movement relative to the bail.

In testimony whereof I affix my signature.

WILLIAM S. GRAHAM.